United States Patent
Davis

[15] 3,652,813
[45] Mar. 28, 1972

[54] CORDLESS ELECTRIC CROSS CONNECT PANEL WITH IMPROVED RECIPROCATING CONTACT ASSEMBLY

[72] Inventor: Ariel R. Davis, 3476 Fleetwood Drive, Salt Lake City, Utah 84109

[22] Filed: Jan. 13, 1971

[21] Appl. No.: 106,085

[52] U.S. Cl. .............................................200/16 D, 317/112
[51] Int. Cl. .........................................................H01h 15/00
[58] Field of Search ..........................200/16 D; 317/112, 113

[56] References Cited

UNITED STATES PATENTS

| | | | |
|---|---|---|---|
| 2,796,473 | 6/1957 | Davis | 200/16 D |
| 3,467,922 | 9/1969 | Greenwall, Jr. et al. | 200/18 |
| 3,496,421 | 2/1970 | Greenwall, Jr. | 317/112 |
| 3,603,747 | 9/1971 | Davis | 200/1 R |

*Primary Examiner*—J. A. Scott
*Attorney*—George C. Bower

[57] ABSTRACT

A cross connect or patch panel has a bus bar supply section, a cross connect load section and a support frame for the supply and load sections. The thin bus bars of the supply section are spaced by insulating strips and thin separators between the strips and bars. The support frame has two supports extending longitudinally along opposite edges of said supply section. The load sections have individual modules with load rails fastened thereto. Circuit breakers are, respectively, attached to opposite ends of the modules and the supports. The supports also function as heat sinks. The load rails of the modules are respectively connected to the circuit breakers by flexible leads and may be flat or L or U shapes. The modules have notches corresponding to respective bus bars and the contact assemblies have indexing keys fitting in the slots so that the conductive blades of the contact assemblies are definitely fitted in the desired grooves.

13 Claims, 13 Drawing Figures

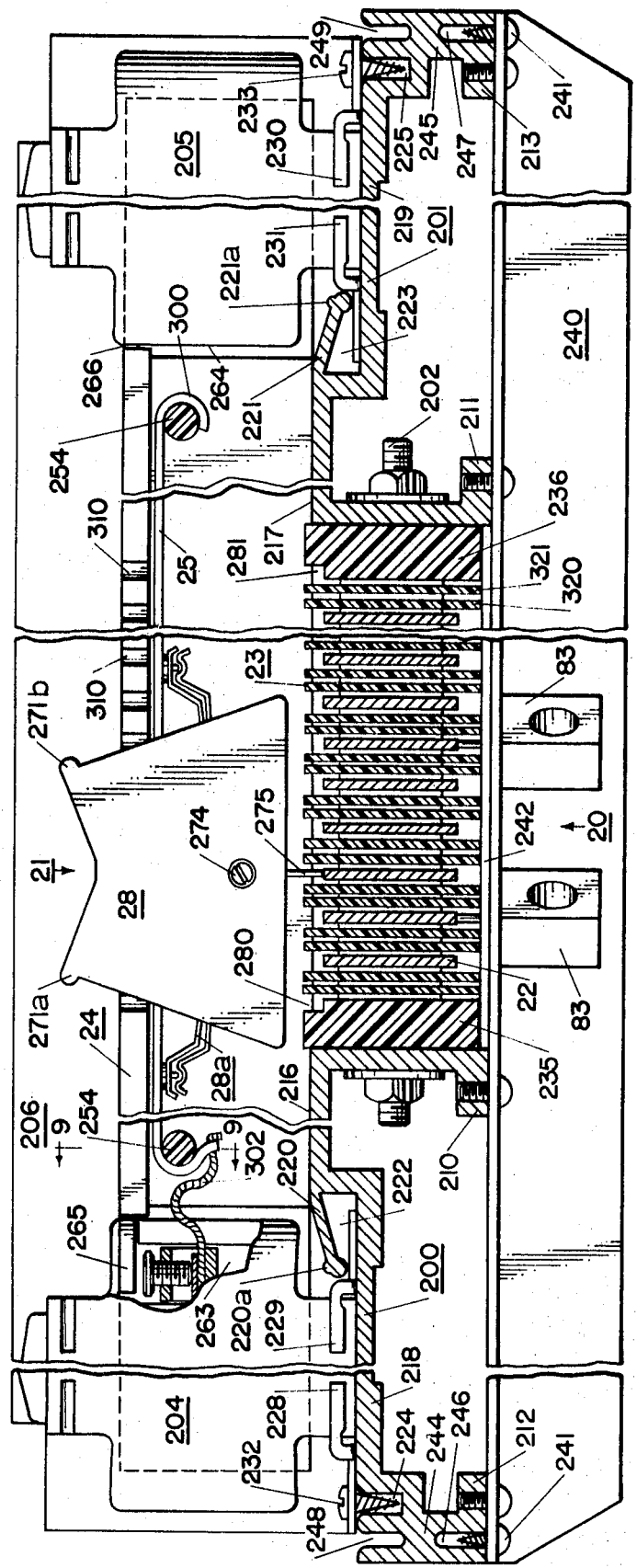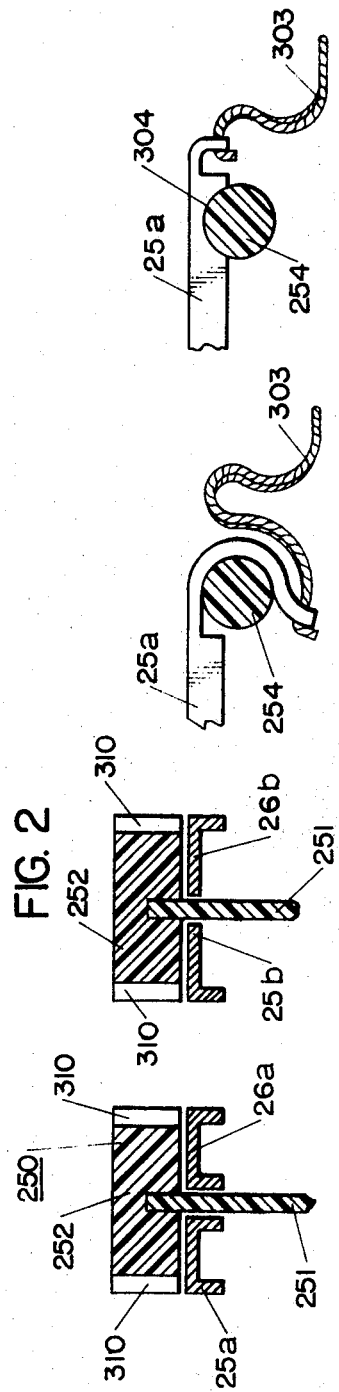

INVENTOR.
Ariel R. Davis

BY George C. Bauer
Attorney 3,652,813

CORDLESS ELECTRIC CROSS CONNECT PANEL WITH IMPROVED RECIPROCATING CONTACT ASSEMBLY

RELATED APPLICATIONS

This relates to my copending application Ser. No. 883,009 filed on Dec. 8, 1969 now U.S. Pat. No. 3,603,747 and entitled "cordless Cross Connect Panel" which is a continuation in part of my abandoned application Ser. No. 660,988 filed on Aug. 16, 1967 and entitled "Cordless Cross Connect Panel."

BACKGROUND OF THE INVENTION

This invention relates to cordless electric cross connect panels and is directed to the electrical connections of the cross connect load section and bus bar supply section.

As described in the related applications a cross connect or patch panel, often referred to as switchboards in the stage lighting art, has been developed and is now being sold that provides the largest number of connections for the current transmit and the space required for installation than any other presently available or known cross connect panels.

Another feature is the positive engagement and disengagement of the contact assemblies with the input bus bars. A further feature is the mounting of the circuit breakers on the support frame at opposite ends of the individual cross connect modules.

Further improvements of the cross connect panel are desired to have the load rails independently mounted on the cross connect modules from the circuit breakers. In the panel described in the related applications the load rails are directly connected to the breaker and are inserted in the cross connect modules when the circuit breakers are attached. For assembly purposes it is desirable to have the load rails mounted separately from the breakers. Also on the contact assemblies it is desirable that the positions of the contact assemblies are positively related to the respective bus bar for precise engagement by the desired contact blade. An increase of the cross section of the individual bus bars and rails is very advantageous, in that it increases the current carrying capacity of the bars and increases the heat radiation surface of the rails. It also makes the rail stiffer and straighter.

OBJECTS AND SUMMARY OF THE INVENTION

An object of this invention is to increase the current passed by the cross connect panel with only an insignificant increase in size of the panel and no increase in the size of the current carrying components.

Another object of the invention is to positively relate the position of the handle of a contact assembly to the respective input bus bar.

Another object of the invention is to fasten the load raised to the cross connect modules so the cross connect module can be handled and mounted as individual units for inspection or repair.

Another object of the invention is to enclose the electrical connections and attach the load rail assemblies to the respective circuit breakers after the load rails are mounted on the cross connect modules.

In summary this invention comprises the electrical isolation of the bus bars and enclosing of current carrying parts with the mounting of the load rails on the cross connect module for subsequent attachment of the rails to respective circuit breakers by flexible leads and the positive indexing of the contact assemblies to each bus bar.

Other objects and advantages will be apparent from the following description taken in connection with the drawings.

BRIEF DESCRIPTION OF THE DRAWINGS

FIG. 2 is a cross sectional view of the cross connect panel taken along line 2—2 of FIG. 1.

FIG. 10 is a partial and sectional view of another embodiment of the load rail having a U-shape.

FIG. 11 is a partial sectional view of another embodiment of the load having a L-shape.

FIG 12 is a side end view of the U-shape rail connected to the fastener.

FIG. 13 is a side end view of the U-shape rail being notched to lock with the fastener.

DETAILED DESCRIPTION

Introduction

Figure 1:
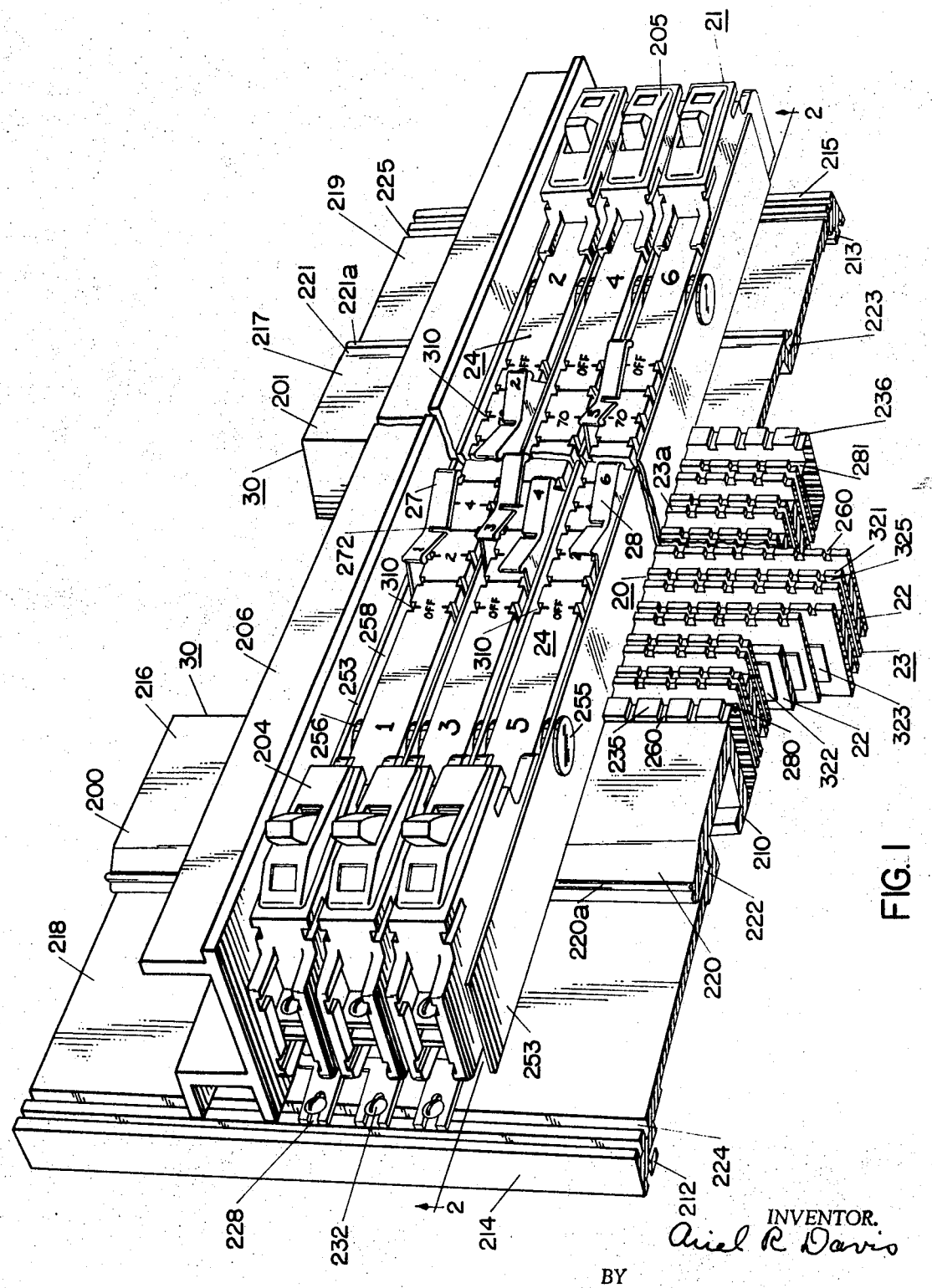
FIG. 1 is a fragmentary perspective view of the cross connect panel.

The cordless patch panel comprises a heavy current bus bar supply section 20 and a front cross connect load section 21. The bus bar supply section comprises conductive input bars or buses 22 and insulating strips 23 between the bars. The cross connect load section comprises cross connect modules 24 having two rails 25, 26 and two movable contact assemblies 27, 28 for selectively connecting the rails to the same input bus or to separate input buses. Load circuits connected to the rails may include any power consuming device such as stage lights. The buses 22 are connected to a power source. The modules 24 are connected to control devices (not shown) such as theatre lights through circuit breakers 204, 205 on the support frame. The sections 20 and 21 are mounted on a supporting frame 30.

Bus Bar Supply Section

The bus bar supply section 20 has longitudinally extending copper bus bars 22 separated by the wider insulating means or strips 23a. The length and number of the bus bars and insulating strips depend on the size of the panel. The insulating strips extend forwardly and rearwardly of the bus bars to provide electrical isolation of the bus bars and grooves on front for the blades of the movable contact assemblies 27, 28. On the back the bus bars are square shaped lugs 83 for connection of the bus bar to the input supply lines. The lugs are offset from one another to provide ample space for leads.

The insulating means or strips 13 between the bus bars extent beyond the contact or blade engaging edges on the load section side to form grooves or channels crosswise to the modules of the load section and the movement of the contact assemblies. The insulating means also extend beyond the bus bars on the opposite side of the bus bar supply section. In this embodiment each of the insulating means is formed of two insulating strips 320, 321. These strips may be in longitudinal segments with the abutting lugs of one strip being overlapped by the adjacent strip. This lends versatility to assembling of the bus bar section and supply of the insulating means.

A particular feature of this embodiment are the insulating separators 322 on each side of the bus bars and the insulating separators 323 between the strips 320, 321. The separators are of less width than the bus bars or strips to form narrow channels 324 and 325 between the bus bars and strips and between the strips. These channels increase the length of the surface path between adjacent bus bars and increases the voltage rating of the panel with only a slight increase in size of the bus bar section.

The separators 322 and 323 may be 0.015 inches in thickness and the bus bars 22 are in the order of 0.060 to 0.070 inches and the insulating means 320, 321 in the order of 0.050 inches thick.

Support Frame

The supports 200, 201 of the support frame extend longitudinally on opposite sides of the bus bar supply section 20 and may be made of any length to accommodate the desired number of cross connect modules. The supports are single extruded pieces that are stiff and rigid to provide a firm support for the cross connect panel and rigid connection to a supporting frame (not shown). The supports have a cross sectional U-shape configuration transverse to the bus bars 20. The cross sectional U-shape is formed by inner L-shaped flanges 210, 211 and outer L-shaped flanges 212, 213 extending along opposite edges of the respective outwardly facing walls 214, 215. The width A of the inner flanges are the same or about the same as the width B of the insulating members 23 of the bus bar supply section. The width of the support is several times the width of the inner flanges 210, 211. The supports therefore have a shallow configuration.

The two supports have inner portions 216, 217 and outer portions 218, 219. The outer portions are greater in width than the inner portions and have the circuit breakers 204, 205 fastened thereto. The outer portions are two and half times as wide as the inner portions. Deformable flanges 220, 221 extend from the upper edges of the inner portions in the direction of the width of the supports. Longitudinally extending beads 220a, 221a are provided along the edges of the flange and are engaged by the tool pressing against the flanges to bend them downwardly or rearwardly. Narrow longitudinal slots 222, 223 between the edges of the flange and the outer portions. Grooves 224, 225 extend longitudinally along the respective edges of the outer portions. The circuit breakers have mounting clips 228, 229, 230, 231 fastened to the supports by screws 232, 233, respectively, threaded into the grooves 224, 225 and frictionally sliding into the slots 222, 223. Along the outer sides of the flanges 212, 213 are T-shaped members 244, 245 forming slots 246, 248 and 247, 249, respectively. The slots and members extend the length of the respective supports. The screws 241 may be threaded into the slots 246, 247 for fastening the straps 240. The straps function as stiffners.

The supports are fastened to the bus bar section 20 and to one another by rods 202 passing through the bus bars 22, insulating strips 23a, insulating members 235, 236 and the flanges 210, 211. Insulating members 235, 236, have a substantially greater thickness than the insulating strips 23. These members are between the flanges 210, 211, respectively, and the bus bars and insulating strips.

The supports 200, 201 are also fastened together by U-shaped straps 240 and end members 206. The straps 240 extend transversely across the back of the patch panel and fastened by screws threaded into the inner and outer flanges. Insulating layers 242 of plastic material is recessed between the inner flanges and across the back of the bus bar supply section to electrically isolate the respective straps 240 from the bus bars 22. The end members 206 are at opposite ends of the cross connect load section on the front of the panel and are fastened by bolts (not shown) to the supports. The end members reinforce the frame and support the ends of the cross connect section.

Cross Connect Modules

The cross connect modules 24 have a main T-shaped member 250 formed by partition 251 tightly fitting in a lengthwise groove in the load rail backing or cross member 252. Attached to one side of the T-shaped member is a second partition member 253 parallel to the first. Stubs 254 with flat disc-shaped heads 255 are fastened by flat shaped washers 256 on the other side form the heads. The stubs fit snugly into holes in the first partition member. The fastening washers 256 engage the edge of the load rail backing member 252 to space the second partition from first. The free end of the stub passing through the first partition member bears against the head of the adjacent stub of the adjacent module to impart firmness and rigidity to the successive modules. The partitions form channels for the movable contacts 27a, 28a and the fastening washers 256 form handle slots 257 between the second partition member and the load rail backing member to pass the movable contacts 27a, 28a.

The edges of the insulating strips 23a have aligned notches 260 for receiving the inner edges of the vertical partition members 251, 253. The interlocking of the edges of the partition members and insulating strips holds the inner portions of the partition members in proper space relation. The outer portions are held in position by the end to end engagement of the stubs. The partition members are thin flexible pieces. The interfitting of the edges into the grooves and the clamping of the outer edges interlocks the cross connect modules in a firm fixed relation. Thus, the modules with the load rail backing member 252 and two partition members 251, 253 in side-by-side relation form successive parallel movable contact channels 261, 262.

At opposite ends of the modules are circuit breakers 204, 205 in planar or end-to-end alignment with modules and transverse to the supports. Mounting clips 228, 229, 230, 231 are pressfitted into the opposite lower ends of the circuit breaker by fitting in the slots 222, 223 and under flanges 220 221 extending from the inner portions 216, 217 and by screws 232, 233 threading into the grooves 224, 225.

The rails 26, 25 are attached by flexible leads 302, 303 to the circuit breakers 204, 205, respectively, and extend in respective channels 261, 262. The flexible leads 302, 303 are connected to terminals (not shown) in the recesses 263, 264, respectively. In the contact module the rails fit between the stubs 254, and the load rail backing member 252 to firmly hold the rails in place between the partition members 251, 253 and against the member 252. The load rail backing member has end tabs 265, 266 narrower than the width of the member 252. The tabs fit in grooves or recesses 263, 264 in the ends of the circuit breakers facing the contact module and form an insulating cover over the terminals of the breaker. The circuit breakers 204, 205 firmly hold the contact module 24 in place on the frame.

Figure 3:
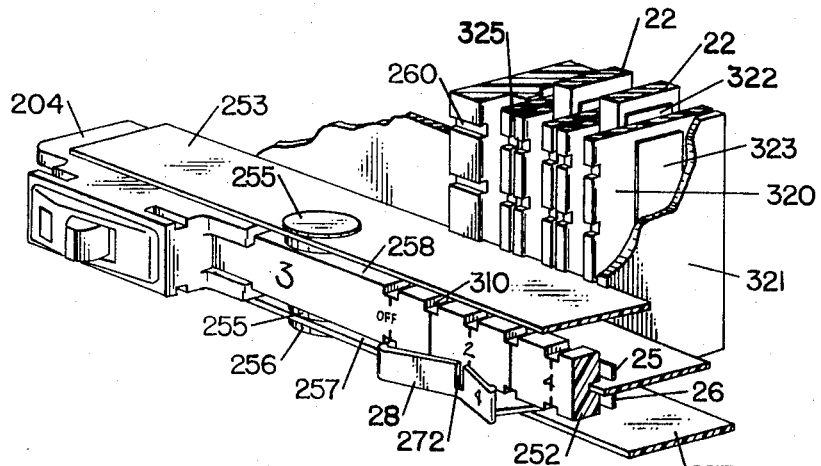
FIG. 3 is a fragmentary perspective view with the bus bar section and a cross connect module fragmentarily and sectionally shown.
Figure 9:
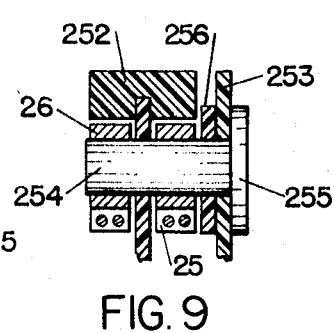
FIG. 9 is a sectional view of the module taken along line 9—9 of FIG. 2 to illustrate the interconnection of the fasteners and the load rails.
Figure 4:
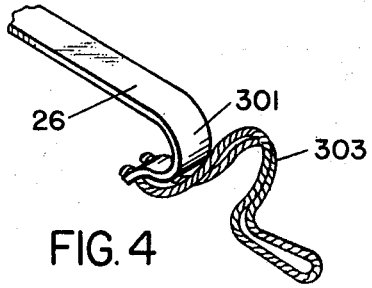
FIG. 4 is a perspective view of the flexible lead bearing end of the rail.

The rails 26, 25 may be flat strips as shown in FIGS. 2, 3 and 9 with the ends 300, 301 adjacent the circuit breaker being semi-circularly curved to hook around the respective studs 254 and lock the rails against longitudinal movement or displacement along the module. The plastic stubs are pressed or fitted through these curved ends to mount the rails on the modules. Thus the rails are a part of the module which may be handled as a unit for mounting the module on the load section and attaching to the circuit breakers. As previously explained the modules are attached to the circuit breakers at each end by fitting longitudinally into slots in the ends of circuit breakers. The modules are then mounted on the support frame by the circuit breakers.

In this embodiment the ends 301 have the free end of the curved portions extended a short amount to form terminals for attachment of the flexible leads 302, 303 at opposite ends of the module. The flexible leads are connected to the respective circuit breakers 204, 205.

The rails may have various shapes. In FIG. 10 the rails 25a, 26a, are shown with U-shapes and in FIG. 11 the rails have L-shapes. These shapes extend at least one side of the rails away from the cross member 252 into the channels to form grooves for the contacts of the contact assemblies and restrict the sidewise play of the assemblies and stiffen the rails. In FIG. 11 the extending sides are along the edges of the rails opposite from the partition 251.

The sides (FIG. 12) may terminate short of the stubs 254 and the ends curved as in the embodiment of FIG. 2 or may extend as shown in FIG. 13 and have notches 304 interfitting with the stubs 254 to hold the rails longitudinally. The stubs function as rail holding means transverse to the respective modules. Thus the curved portions and notches and the stubs form interengaging means of the rails and modules cooperating to interlock the rails with the modules.

Contact Assemblies

Figures 5, 6:
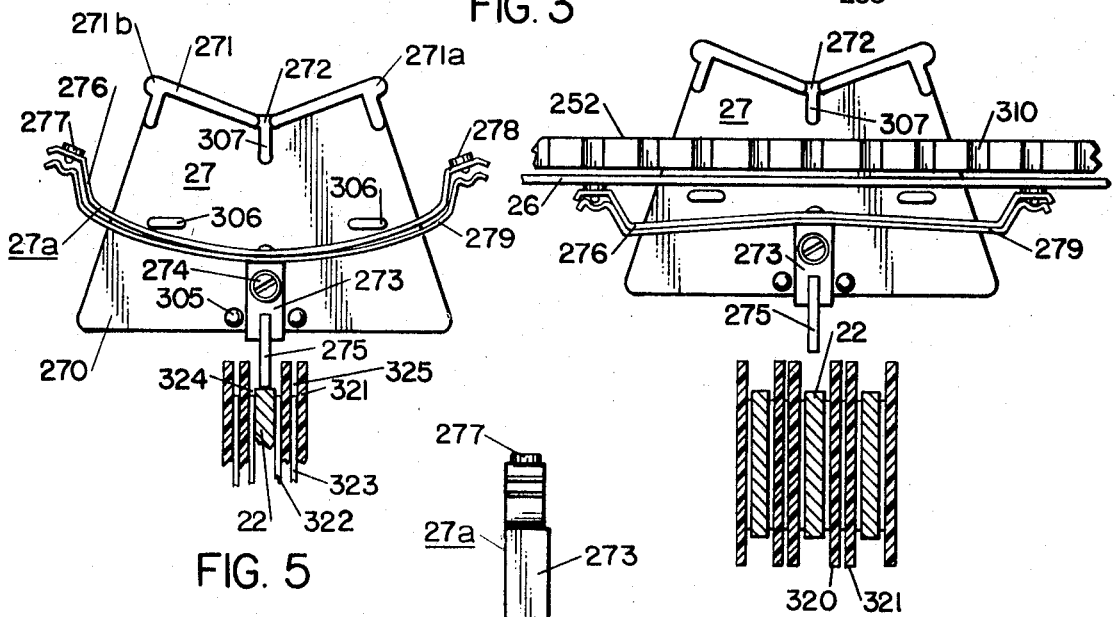
FIG. 5 is a side view of a contact assembly in engagement with a bus bar.
FIG. 6 is a side view of a contact assembly lifted clear of a bus bar.
Figure 7:
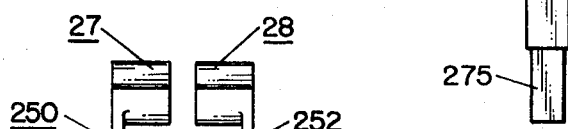
FIG. 7 is a side view of the contact blade.
Figure 8:
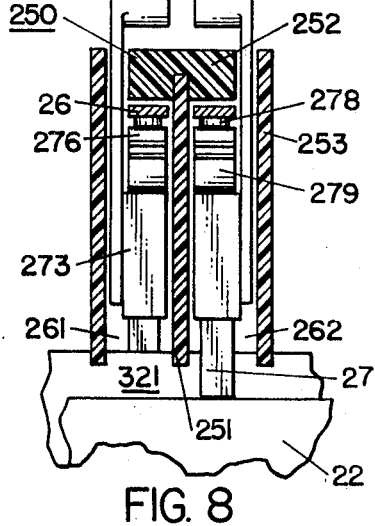
FIG. 8 is a sectional view of the module in position.

The contact assemblies 27, 28 are identical and comprise mounting or actuating members 270 extending through the slots 257, 258 in the contact modules 24 with the flanges or handles 271 normal to the respective members 270. The handles are V-shaped and have grips 271a, b for grasping by the fingers to lift the assemblies. A key 307 fits in notches 310 along the edges of the cross member to positively position the blade in relation to the index on the contact module. Slot 272 at the base of the V of the handle extends to the key 307 for viewing and aligning with the index. The blocks 273 are mounted on the side of the respective actuating members by screws 274 threaded therein. The brass blocks extend between the holding bosses 305 and beyond the respective actuating members and have contact blades 275 mounted respectively therein and extend from edge. The resilient current conducting strips 276 of copper are intermediately mounted to the respective ends of the block 273 opposite to the contact blade 275. The conducting strip bearing end of the block 273 is located in about the center of the respective actuating member. The conducting strip 276 extends along the side of the actuating member beyond the end edges. L-shaped tips 277, 278 on the ends with silver contact buttons engage one of the rails on substantially equal distances from the center of the actuating members. The conducting strips apply equal and opposite torques to the contact assembly. Thus, each assembly will stand perpendicular to the bus bars. The upward spring movement of the strips 276 is limited by stops 306. This assists in the positioning of the contact assemblies on the modules. Resilient steel strip 279 backs the conducting strip to provide adequate contact pressure. The tips of the strips 279 extend in back of the button bearing tips of the conductive strips 276 to provide contact pressure as shown in FIG. 6. The tips of the strips have curved portions between the pressure portions to clear the protruding ends of the tips. The flanges, block, blade and conducting strips are on the same side of the actuating member.

The contact assembly is picked up by the tips 271a, 271b and lifted clear of the insulating strips 23a and moved along the channel until the assembly is centered at the indicia on the exposed surface of the member 252. The contact assembly is then released to engage the selected bar. As best seen in FIG. 3 the stubs 254 are adjacent to a respective circuit breaker and also function as stops engaged by a respective tip 277, 278. When in engagement with a stub the blade 275 is in a position for insertion into the grooves 280, 281 formed by the last insulating strips 23a along a respective side and respective insulating members 235, 236. These are neutral positions at each end of the module.

Markings and Indicia

The load rail backing member is marked on exterior surface to indicate each bus bar. The contact assemblies and associate circuit breakers are correlated by identical members being placed on the handles 271 and the exterior surface of the load rail backing members adjacent the associated circuit breaker. The toggles on the circuit breakers are on the opposite side from the supports. The patch panel may be mounted with the bus bars extending vertically as shown in FIG. 3 or may extend horizontally with the modules extending horizontally or the patch panel may be set horizontal with the contact assemblies moving horizontally in the channels. The preferred manner is to position the panel with the input bus bars extending vertically and the contact module extending horizontal to indicate each bus bar. The surfaces are also marked at each end to identify or number the associated circuit breaker. The contacted assemblies carry the corresponding number.

The supports may be made from extruded aluminum and cut to the desired length. The supports are easily fastened together by the rods 202 passing through bus bars and insulating strips. Insulating grommets isolate the copper bars.

The cross connect modules, the contact assemblies and bus bars are positively interrelated so that on setting the contacts in the current passing relation with the bus bars, the blades of the contact assemblies will be in engagement with the bus bar corresponding to the indivia on the cross member designating the bus bar. The contact assemblies have keys 307 molded with the index slot 272 and extending towards and in line with the blades 275. The cross members have square notches 310 spaced along the opposite side edges of the cross member and facing into the slots 257, 258. The keys have lengths to clear the cross members and disengage from the notches 310 for longitudinal movement of the contact assemblies. Each slot has a blade indicating indicia associated therewith and has a length, due to the thickness of the cross member, to guide the key and contact assembly which in cooperation with the insulating strips forming the channel above the bus bar therebetween prevents the blade from engaging any other bus bar except the one designated by the indicia at the corresponding notch.

Summary of Features and Advantages

It is thus seen from the foregoing description that the supporting frame may be made from formed plastic pieces or from extruded aluminum. The pieces may be readily assembled and formed into a supporting frame that holds the power buses so that conductive strips may be used having a considerable length in relation to thickness and contact area. This provides for a considerable amount of copper to carry the current and dissipate heat that may be produced between the engaging surfaces of the power buses and the contact blades.

The contact assemblies may be made of molded plastic pieces that are easily assembled to provide a positive blocking of the contact blade out of engagement and a positive engagement of the contact blade without the contact assembly or the actuator varying the longitudinal position, so that at all times the position of the contact assembly in relation to the power bus being engaged remains fixed. Thus there is no doubt as to the power bus being engaged.

The cross connect modules also are readily manufactured by standard plastic molding techniques and are readily assembled and mounted on the supporting frame. Individual modules may be independently removed from the supporting frame. The terminals on the cross connect modules and the terminals on the power buses are readily accessible for connecting leads thereto. The connection of the leads to the power bus terminals readily permits the rotation of the panel from its seating in a casing for maintenance purposes.

Various modifications and changes may be made in the foregoing embodiments without departing from the invention as set forth in the appended claims.

I claim:

1. A cross connect panel comprising:
   a bus bar supply section having a plurality of bus bars spaced in side-by-side relation and insulating means therebetween to electrically isolate said bus bars;
   frame means for supporting said bus bars and insulating means; a cross connect load section having a plurality of cross connect modules with contact assemblies moveable along said respective modules for engagement of said bus bars,
   characterized by said insulating means comprising strip means between said bus bars and extending beyond said bus bars towards said modules to form channels above said respective bus bars to receive said contact assemblies; and
   insulating separators between said strip means and said bus bars to further space said strip means on opposite sides of said bus bars.

2. A cross connect panel as set forth in claim 1 wherein each strip means between said bus bars comprises two longitudinally extending strips.

3. A cross connect panel as set forth in claim 2 wherein said strips of each strip means have insulating spaces therebetween to form a narrow slot between said strips of each strip means.

4. A cross connect panel as set forth in claim 3 wherein said insulating separators are segmented with the abutting ends of the segments of one separator being overlapped by the segments of other separators.

5. A cross connect panel comprising:

a bus bar supply section having a plurality of bus bars spaced in side-by-side relation and insulating means therebetween to electrically isolate said bus bars;

frame means for supporting said bus bars and insulating means and having circuit breakers;

a cross connect load section having a plurality of cross connect modules with rail means and connections of said rail means to respective circuit breakers and contact assemblies moveable along said respective modules in engagement with said respective rail means and moveable in and out of engagement with said bus bars, characterized by said rail means being attached to said respective modules independently of said circuit breakers and said connections being flexible leads.

6. A cross connect panel comprising:

a bus bar supply section having a plurality of bus bars spaced in parallel side-by-side relation and insulating means therebetween to electrically isolate said bus bars;

frame means supporting said bus bars and plurality of circuit breakers;

a cross connect load section having a plurality of cross connect modules with rail means and connections of said rail means to respective circuit breakers and contact assemblies moveable along said respective modules in engagement with said respective rail means and moveable in and out of engagement with said bus bars, characterized by said modules having holding means at opposite ends and transverse to said modules and, said rail means having means interengaging with said holding means to hold said rail means from longitudinal movement.

7. A cross connect panel as set forth in claim 6 wherein said interengaging means are turned portions bearing against holding means in opposite directions to lock said rail means against displacement longitudinal of said respective modules.

8. A cross connect panel as set forth in claim 6 wherein each rail means has a longitudinally extending side projecting towards said bus bar supply section, and each side has notches adjacent opposite ends forming said interengaging means.

9. A cross connect panel comprising:

a bus bar supply section having a plurality of bus bars spaced in parallel side-by-side relation and insulating means therebetween to electrically isolate said bus bars;

frame means supporting said bus bars and insulating means and having a plurality of circuit breakers;

a cross connect load section having a plurality of cross connect modules with rail means and connections of said rail means to respective circuit breakers and contact assemblies moveable along said respective modules in engagement with said respective rail means and moveable in and out of engagement with said bus bars, characterized by each rail means being U-shape in cross section.

10. A cross connect panel comprising:

a bus bar supply section having a plurality of bus bars spaced in parallel side-by-side relation and insulating means therebetween to electrically isolate said bus bars;

frame means supporting said bus bars and insulating means and having a plurality of circuit breakers;

a cross connect load section having a plurality of cross connect modules with rail means and connections of said rail means to respective circuit breakers and contact assemblies moveable along said respective modules in engagement with said respective rail means and moveable in and out of engagement with said bus bars, characterized by each rail means being L-shape in cross section.

11. A cross connect panel comprising:

a bus bar supply section having a plurality of bus bars having contact engaging edges and spaced in side-by-side relation and insulating means therebetween to electrically isolate said bus bars and extending above said contact engaging edges to form contact receiving grooves;

frame means for supporting said bus bars and insulating means;

a cross connect load section having a plurality of cross connect modules with longitudinal slots and longitudinally moveable contact assemblies in said slots and having blades fitting in said grooves to engage said bus bars, characterized by said modules having notches along one side of said slots and corresponding to said bus bars; and said contact assemblies having keys fitting in said notches to positively and exclusively relate said keys and notches with respective grooves and bus bars.

12. A cross connect panel as set forth in claim 11 wherein said respective keys and blades on said respective contact assemblies are aligned.

13. A cross connect panel comprising:

a bus bar supply section having a plurality of bus bars spaced in parallel side-by-side relation and insulating means therebetween to electrically isolate said bus bars;

frame means supporting said bus bars and insulating means and having a plurality of circuit breakers;

a cross connect load section having a plurality of cross connect modules with rail means and connections of said rail means to respective circuit breakers and contact assemblies moveable along said respective modules in engagement with said respective rail means and moveable in and out of engagement with said bus bars, characterized by said rail means and said modules having interengaging means for holding said rails from longitudinal movement.

* * * * *